United States Patent [19]

Schneiderhan

[11] 3,842,245

[45] Oct. 15, 1974

[54] ELECTRONIC CONTROL SYSTEM FOR PUNCH-TYPE ENCODER

[75] Inventor: Edward M. Schneiderhan, Buffalo Grove, Ill.

[73] Assignee: Cummins-Allison Corp., Glenview, Ill.

[22] Filed: Apr. 19, 1973

[21] Appl. No.: 352,683

[52] U.S. Cl. .......................... 235/61.1, 235/61.7 R

[51] Int. Cl. .......................... G06k 15/00, G06k 5/00

[58] Field of Search .................... 340/172.5; 234/63; 235/61.1

[56] References Cited

UNITED STATES PATENTS

| | | | |
|---|---|---|---|
| 2,775,297 | 12/1956 | Cunningham | 234/63 |
| 2,905,930 | 9/1959 | Golden | 340/172.5 |
| 2,923,924 | 2/1960 | Papo | 340/172.5 |
| 3,020,525 | 2/1962 | Garrison et al. | 340/172.5 |
| 3,069,075 | 12/1962 | Sallach | 234/63 |
| 3,072,328 | 1/1963 | Bewley et al. | 340/172.5 |
| 3,130,903 | 4/1964 | Perry, Jr. et al. | 234/63 |
| 3,706,074 | 12/1972 | McPherson et al. | 340/172.5 |

*Primary Examiner*—Gareth D. Shaw
*Assistant Examiner*—John P. Vandenburg
*Attorney, Agent, or Firm*—Wolfe, Hubbard, Leydig, Voit & Osann, Ltd.

[57] ABSTRACT

A system for reading data from a document and then re-recording the read data on the same document by perforating the document at a perforating station located on the same processing line as the reading station. The reading station responds to data recorded on a series of documents to produce electrical data signals representing the read data. The perforating station responds to the electrical data signals from the reading station to re-record the read data on the same documents from which the data was read. The perforations can be subsequently read with a higher degree of reliability than the original data record. The data signals generated at the reading station are loaded into memory units which hold the signals until a document is sensed arriving at the perforating station. A data retrieval system then unloads the data signals from the memory units and transmits the data to the perforating station to actuate a punch mechanism. The use of the memory unit permits the data to be read at a much higher frequency at the reading station than the frequency at which the signals can be utilized at the perforating station. When the document is punched at the perforating station, electrical verification signals are generated representing the perforating elements that actually pass through the document, and these signals are then compared with the signals transmitted to the perforating station to detect any errors in the data recorded on the documents at the perforating station. Means are also provided for sensing a condition when the entire capacity of the memory is filled, and producing a signal indicating that there is no memory capacity available for storing additional data signals.

13 Claims, 5 Drawing Figures

ELECTRONIC CONTROL SYSTEM FOR PUNCH-TYPE ENCODER

The present invention relates generally to systems for processing data-bearing documents and, more particularly, to an improved system for reading data from a document and then re-recording the read data on the same document by perforating the document.

It is a primary object of the present invention to provide an improved system for reading and re-recording data on documents at extremely fast rates. In this connection, it is a more particular object of the invention to provide such a system which automatically reads and re-records the read data on the same documents at successive stations along a single documents processing line while documents are being continuously driven along the line at high speeds.

Another object of the invention is to provide an improved document processing system of the foregoing type which enables data to be read from the documents at the reading station at a much higher frequency than that at which the data is re-recorded on the documents at the perforating station, even though the reading station and the perforating station are in line with each other.

It is still another object of the invention to provide such an improved document processing system which permits data to be read from a document at the reading station at the same time that data read from a previous document is being re-recorded on the previous document at the perforating station.

It is a further object of the invention to provide an improved document processing system of the type described above which monitors the data that is re-recorded on the documents at the perforating station and compares such data with the data read at the reading station to detect any errors in the re-recorded data. A related object is to provide such a system which automatically stops the flow of documents when an error is detected so that the error can be corrected.

Figure 1:
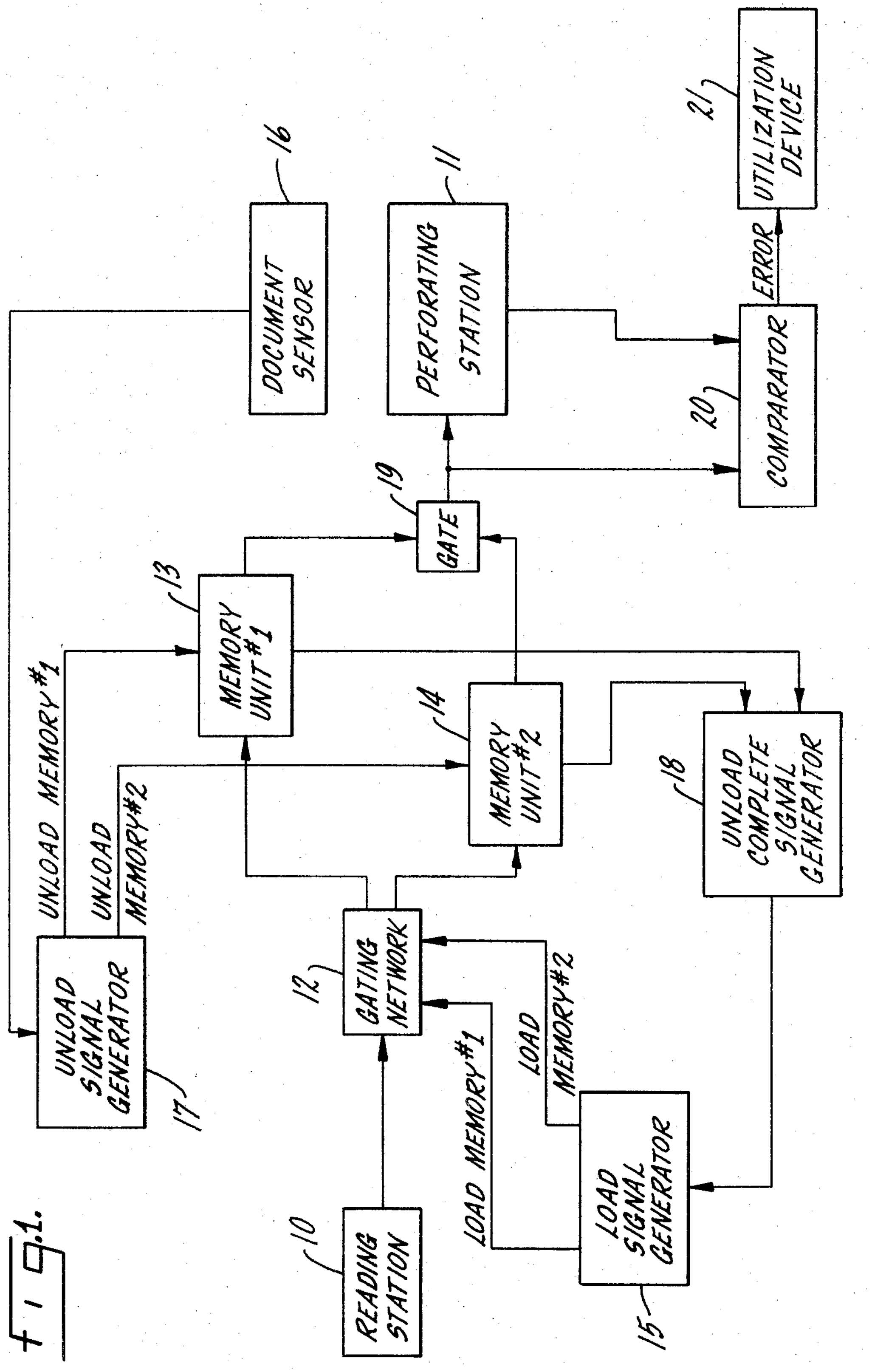
Figure 2A:
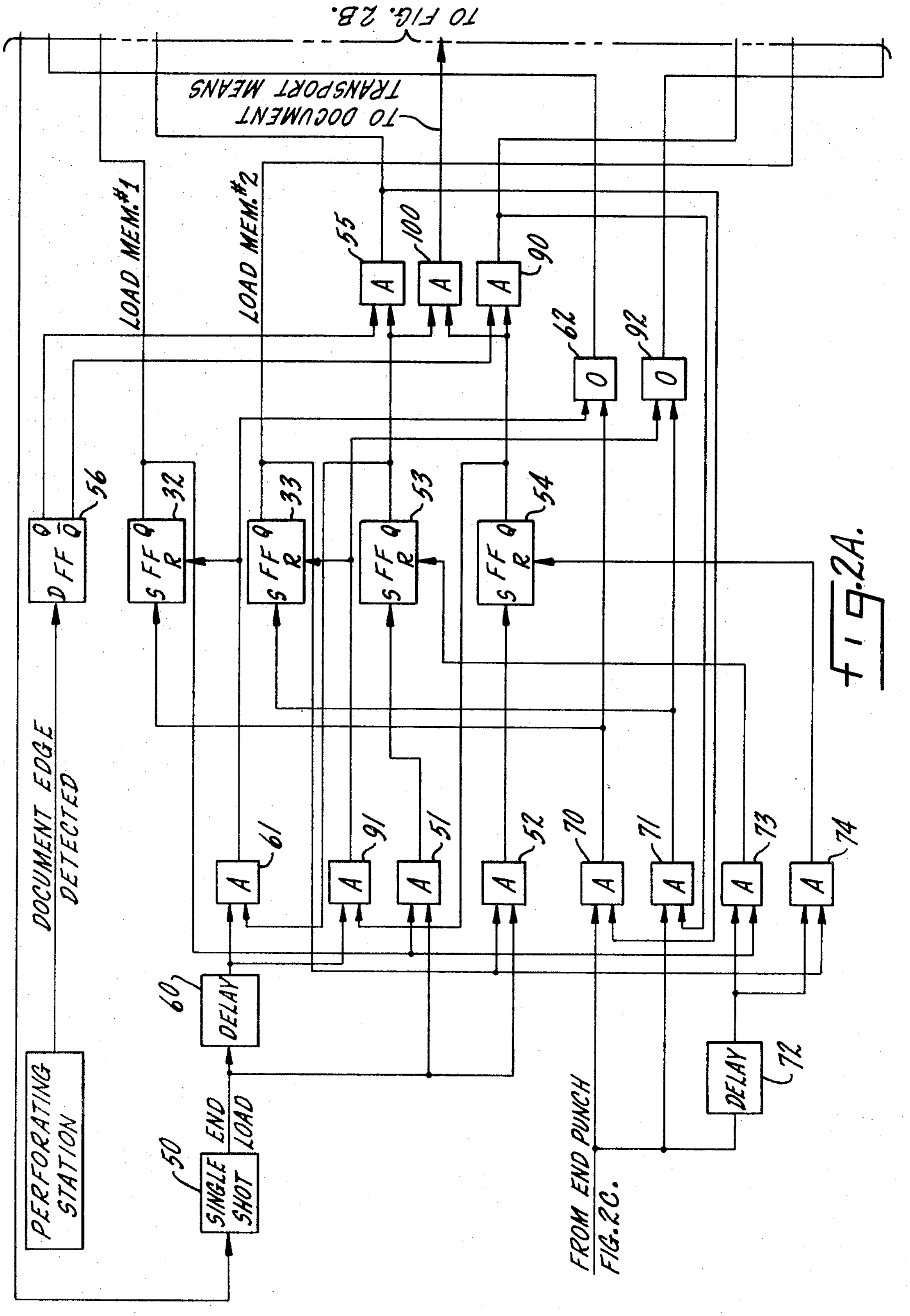
Figure 2B:
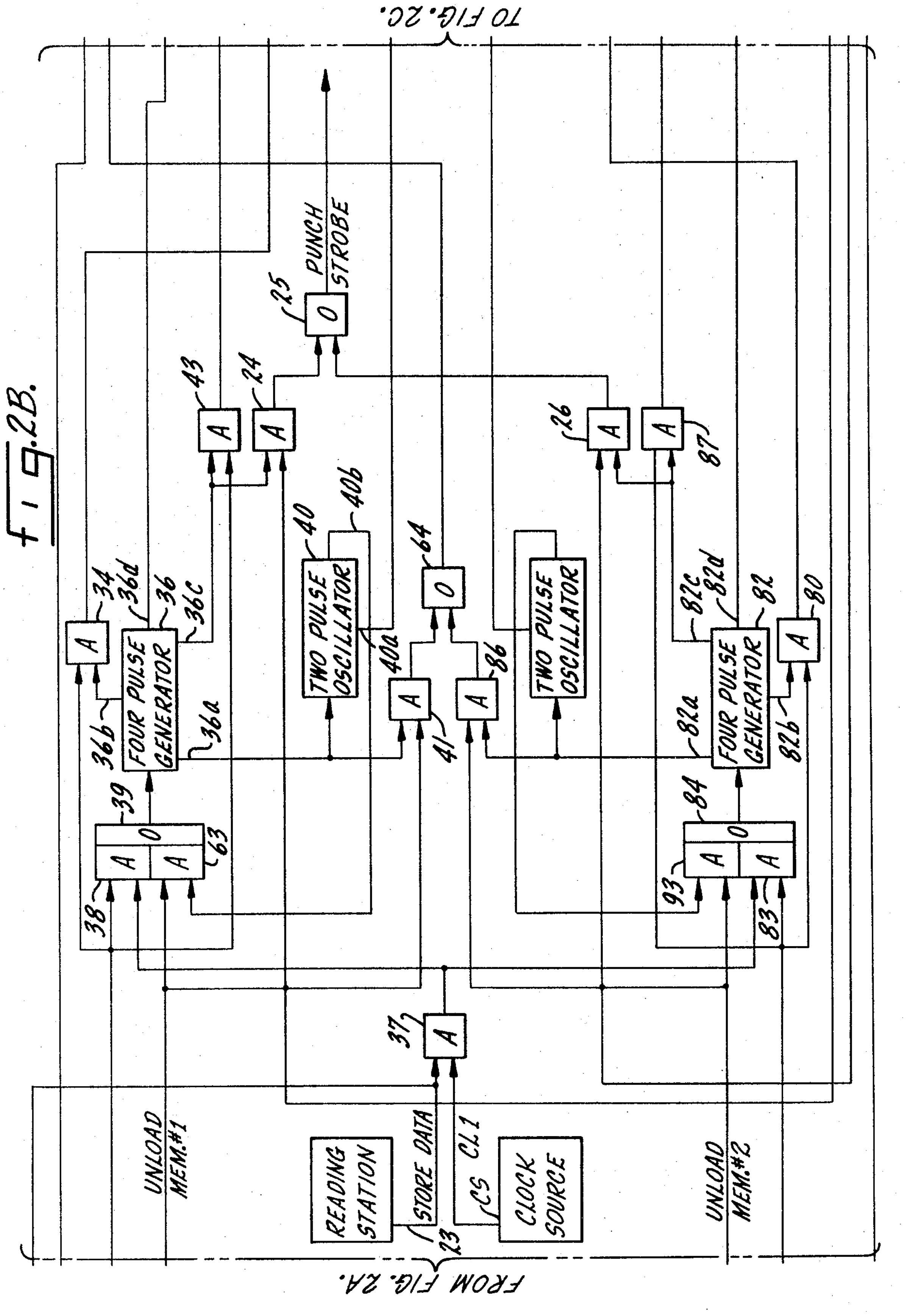
Figure 2C:
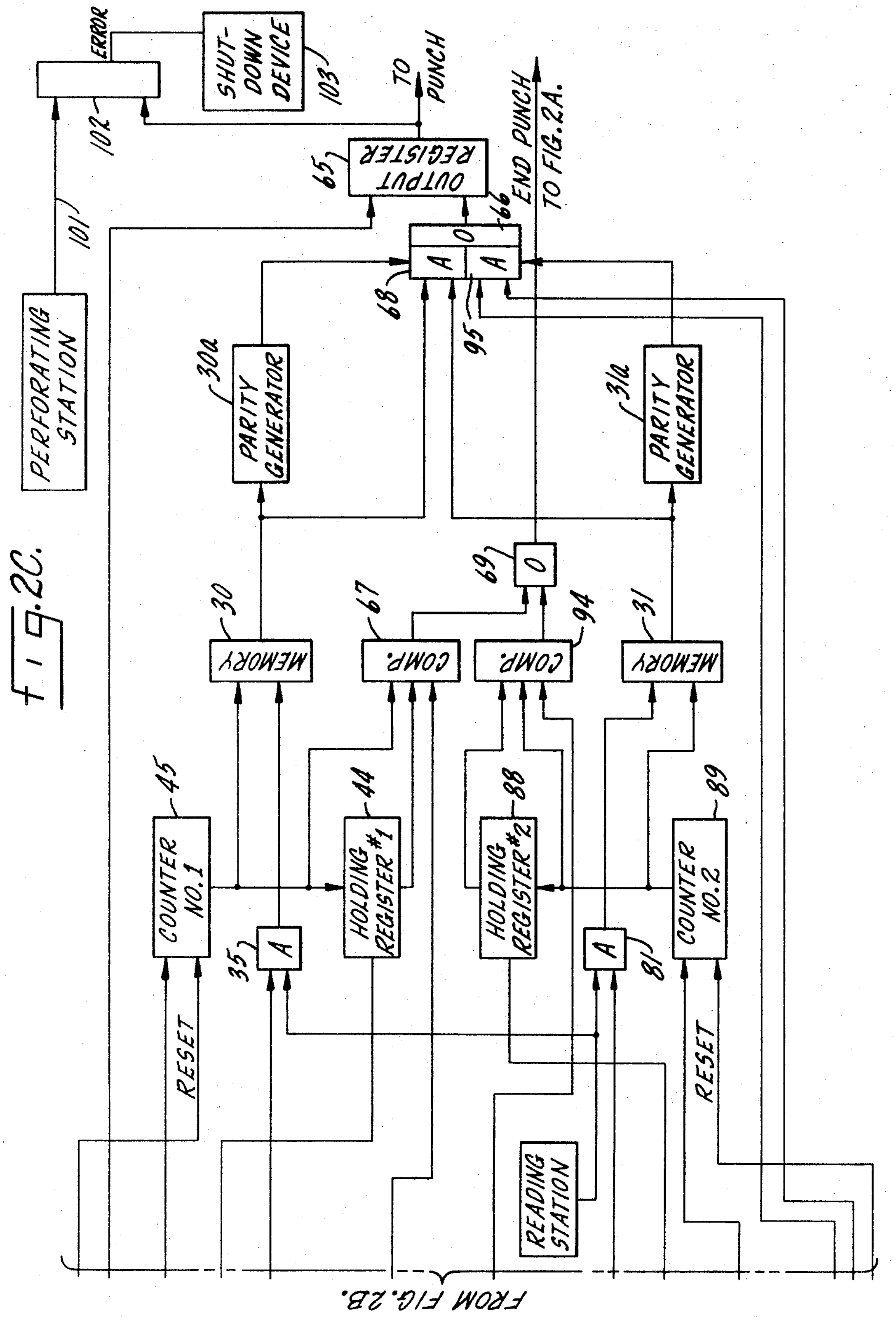
Figure 3:
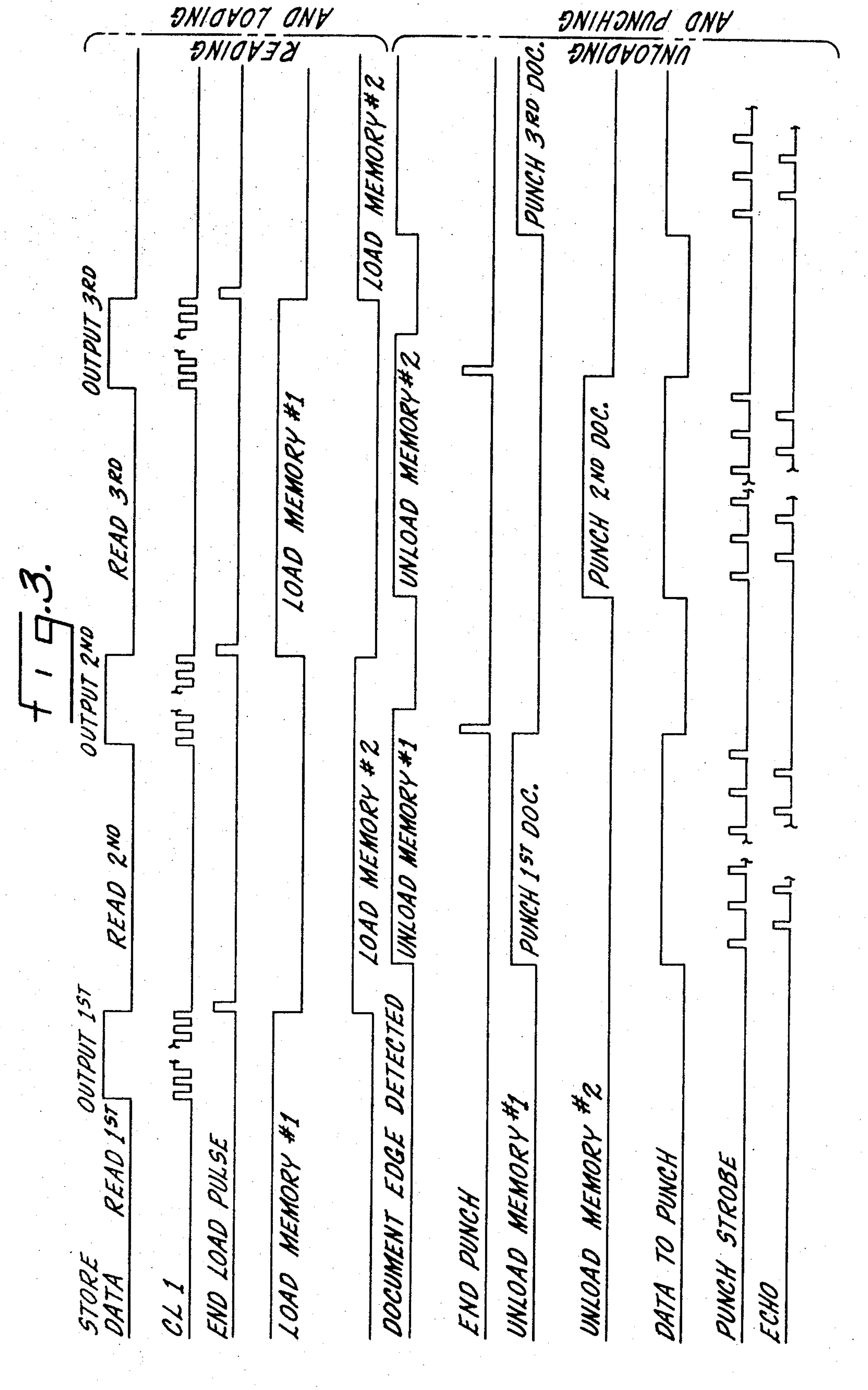

Other objects and advantages of the invention will be apparent from the following detailed description taken in connection with the accompanying drawings, in which:

FIG. 1 is a block diagram of an electronic punch control system embodying the invention;

FIG. 2, constituted by FIGS. 2A, 2B and 2C when joined, is a more detailed block diagram of the system illustrated in FIG. 1; and FIG. 3 is a timing diagram illustrating certain signals generated during operation of the control system illustrated in FIG. 2.

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention.

Before considering the punch control system illustrated in the drawings, it will be helpful to note the symbols and conventions which have been employed in those figures to diagrammatically represent different logic devices and signals. In this connection, the system shown in the drawings operates on a binary logic basis, i.e., each signal which is produced and responded to may have either a binary 1 or 0 value. These might be, for example, voltage levels of +12 volts and zero volts, respectively, which is "positive" logic since the most positive logic voltage level is defined to be the logical 1 state, while the most negative logic voltage level is defined to be the logical 0 state. The system illustrated generally responds affirmatively to binary 1 signals, but when any given signal has a binary 0 value, that will normally produce no response.

The term flip-flop (abbreviated in the drawings as "FF") is used herein to designate a device that exhibits two different stable states. The illustrative system utilizes two different types of flip-flops, namely the D-type and the RS latch. The D-type flip-flop is characterized by a single data (D) input and a clock input (not shown in the drawings), and it may have either or both Q and $\overline{Q}$ outputs available. The data input is a synchronous input, i.e., it does not cause an immediate change in the output, but rather requires the presence or occurrence of a clock pulse at the clock input to generate a change of state in the outputs. When the flip-flop is "clocked" by the occurrence of a clock pulse at the clock input, the binary signal present at the data input is transferred to the Q output, and the $\overline{Q}$ output is always the complement of the Q output. For example, if the signal at the data input is a binary 1 when the flip-flop is clocked, the Q output is a binary 1 signal and the $\overline{Q}$ output is a binary 0 signal after clocking.

The RS latch has two asynchronous control inputs, R and S, and the output changes immediately when either control input changes. When the signals present at the R and S inputs are at different binary levels, the signal present at the Q output is always the same as the signal at the S input and the $\overline{Q}$ output is always the same as the R input.

AND gates and OR gates have been illustrated by blocks with A's and O's therein, respectively. As is well known, the output of the AND gate is always a binary 0 signal except when all inputs are binary 1 signals, in which case the output becomes a binary 1 signal. Conversely, the output of the OR gate is always a binary 1 signal except when all inputs are binary 0 signals, in which case the output becomes a binary 0 signal.

The control system provided by this invention is intended to automatically control perforating equipment of the type described in the assignee's copending Jones et al. application Ser. No. 222,184, filed Jan. 31, 1972, now U.S. Pat. No. 3,780,938 issued Dec. 25, 1973 and entitled "Method and Apparatus for Recording Data by Perforating Record Media." The data recorded on the record media by the perforating equipment is typically data that has been read, usually from the same record media to be perforated, by an automatic reading system which generates electrical signals representing the data to be recorded on the record media by perforating. The reading station may comprise conventional reading equipment, with the particular equipment employed depending on the manner by which the data is recorded on the documents. If desired, the equipment at the reading station may be of the type described in the assignee's U.S. Pat. No. 3,558,859, which is capable of reading data recorded in a variety of different forms, both perforated and printed, both legible and illegible. Reading equipment for generating electrical signals in response to magnetic characters may also be utilized.

The control system of this invention is particularly suitable for controlling a perforating station which is on the same document processing line with a reading station which generates the signals representing the data to be recorded on the documents at the perforating station. For example, both the reading station and the perforating station may be included in the same machine; machines of this type are useful for converting a data record which can be read with only a medium degree of accuracy and reliability, such as a printed code, to a perforated data record which can be read with a high degree of accuracy and reliability. In such machines, the reading station is often used alone, without operating the perforating station, and the reading station may operate at a much higher document throughput rate than the perforating station. Consequently, when both the reading station and the perforating station are in operation, the overall document throughput rate is limited by the perforating station and, therefore, the maximum throughput rate of the reading station cannot be utilized. However, a problem arises because the reading station continues to read each individual document very quickly, thereby generating signals representing the read data at a frequency greater than that at which the signals can be utilized by the perforating station.

Another problem encountered in machines of the type described above is that the reading and perforating stations are inevitably operating simultaneously during certain time intervals, particularly since the perforating station requires considerably more time to encode the document than the reading station requires to read the document. Consequently, the data-representing signals generated by the reading station cannot be fed directly to the perforating station because the perforating station might be, indeed is likely to be, in operation at the time such signals are generated.

One feature of the present invention is that it overcomes the problems described above by providing a pair of memory units each of which receives and stores alternate groups of output signals generated by the reading station in response to alternate documents passed therethrough, and retrieval means for retrieving the signals from the memory units and actuating the perforating station to re-record the read data on the same documents from which the data was read by perforating such documents. While one memory unit is being loaded with signals representing the data read from a given document, signals representing data read from the preceding document are unloaded from the memory unit and fed to the punch mechanism at the perforating station. Thus, the memory units provide an interface between the reading and perforating stations which converts the output from the reading station into a suitable input for the perforating station.

Turning now to the block diagram of FIG. 1, the invention is illustrated in one exemplary application for controlling the transmission of data signals from a reading station 10 to a perforating station 11. Each time the reading station generates data signals, it also generates a "store data" signal which is applied to a gating network 12 for controlling application of the data signals to a pair of memory units 13 and 14. The gating network 12 also receives a "load memory No. 1" or a "load memory No. 2" signal from a load signal generator 15, and the coincidence of the "store data" signal from the reading station 10 with one of the signals from the generator 15 initiates loading of one of the memory units. More specifically, if the "store data"signal coincides with the "load memory No. 1" signal, the gating network 12 directs the data signals from the reading station 10 to the memory unit 13; if the "store data" signal coincides with the load memory No. 2" signal, the data signals are directed to the memory unit 14.

To unload the memory units 13 and 14 and transits the data signals stored therein to the perforating station 11, a document sensor 16 triggers a bistable "unload" signal generator 17 each time a document approaches the perforating station. As the generator 17 is repetitively triggered, it alternately produces "unload memory No. 1" and "unload memory No. 2" output signals on lines leading to the two memory units 13 and 14, respectively. When either of the memory units 13 or 14 is unloaded, it produces an output signal which triggers an "unload complete" signal generator 18 which supplies an enabling signal to the "load" signal generator 15 to indicate that one of the memory units is ready to be re-loaded. The generator 15 responds by producing either the "load memory No. 1" or the "load memory No. 2" output signal.

In accordance with one particular feature of the invention, the output signals from the memory units 13 and 14 are compared with "echo or verification" signals representing the punch elements that actually pass through the document at the perforating station to detect any error between the commanded punch operation and the actual punch operation. Thus, as the memory units 13 and 14 are unloaded, the data signals stored therein are passed through a gate 19 to actuate the punch mechanism at the perforating station 11, and the output signal from the gate 19 is also applied to a comparator 20. The other input to the comparator 20 is the verification signal from the perforating station, representing the punch elements actually passed through the document. If a discrepancy appears between the two inputs to the comparator 20, indicating that the punch mechanism has not accurately responded to the command signals, the comparator 20 produces an "error" output signal for actuating a suitable utilization device 21 such as an automatic shutdown device for stopping the flow of documents when an error is detected.

Turning next to FIG. 2, there is shown in more detail an exemplary system of the type illustrated generally in FIG. 1. In this system, the data signals generated by the reading station 10 each time data is read from a document are presented on line 22, and the "store data" signal (illustrated in FIG. 3) is presented on line 23. In response to successive "store data"signals, the data read from successive documents is stored alternately in two random access memory units 30 and 31; that is, data read from a first document is stored in unit 30, data from a second document is stored in unit 31, data from a third document is stored in unit 30, and so on. Selection of the particular memory unit to receive the data read from any given document is effected by a pair of RS latch-type flip-flops 32 and 33, which are controlled so that the two flip-flops are always in opposite states. That is, whenever the output of the flip-flop 32 is a binary 1 signal, referred to herein as the "set" state, the output of the flip-flop 33 is a binary 0 signal, referred to herein as the "reset" state, and vice versa. Whenever one of the flip-flops is in the set state, the binary 1 output signal from that flip-flop enables the corresponding memory unit 30 or 31 to receive data signals. More specifically, when flip-flop 32 is in the set state, it applies a binary 1 signal to an AND gate 34 which, when enabled by a binary 1 signal at its other input, applies a binary 1 signal to a second AND gate 35. This enables the gate 35 to pass the data signals, applied to its other input, to the memory unit 30.

Enabling of the gate 34 is controlled by one of the outputs of a four-pulse generator 36, which sequentially produces an output pulse on each of four different output lines 36*a*–36*d* each time it is triggered by an input pulse. More specifically, each time the input signal to the generator 36 changes from the binary 0 level to the binary 1 level, each of the four outputs of the generator 36 are switched from the binary 0 level to the binary 1 level for predetermined intervals that are staggered in time. These outputs are used to control both the loading and the unloading of the memory unit 30. The loading phase of the memory unit 30 is initiated by the "store data "signal on line 23 from the reading station; whenever the "store data" signal goes to the binary 1 it, enables an AND gate 37 to pass clock pulses CL1 (FIG. 3) from a clock source CS to an AND gate 38 which also receives the output signal from the flip-flop 32. Thus, whenever the flip-flop 32 produces a binary 1 output signal, referred to as the "load memory No. 1 "signal (FIG. 3), the gate 38 is enabled to pass the clock pulses CL1 through an OR gate 39 to the input of the four-pulse generator 36. In response to each clock pulse received at its input, the generator 36 produces a sequence of four output pulses on the four output lines 36*a*–36*d*.

The first output pulse from the generator 36, produced on line 36a, is applied to a two-pulse generator 40 and an AND gate 41, both of which are ineffective during the loading phase of each operating cycle but will be discussed in more detail below in connection with the unloading phase. The second output pulse, produced on line 36*b*, enables the AND gate 34 to pass the "load memory No. 1" output signal from the flip-flop 32 on to the gate 35 to enable application of the data signals from line 22 to the memory unit 30.

The third output pulse from the generator 36, produced on line 36*c*, enables an AND gate 43 whose other input is the signal "load memory No. 1" from flip-flop 32. (The pulse on line 36*c* is also applied to a gate 24 which is disabled by its other input during the loading phase.) During the loading phase of each cycle of operation for the memory unit 30, i.e., when the gate 43 is enabled by a binary 1 signal from the flip-flop 32, the gate 43 applies a binary 1 signal to the set input of a holding register 44 which continuously monitors the output of a binary counter 45 which receives the fourth output pulse produced by the generator 36 on line 36*d*. The counter 45 responds to pulses produced on the line 36*d* to produce an output signal representing the number of pulses counted, and this output signal is applied to the address input of the memory unit 30 to store successive bits of data applied to the unit 30 in different positions therein. Meanwhile, each time the counter 45 is incremented during the loading phase, the holding register 44 receives a set input from the gate 43 so that the count accumulated in the counter 45 is stored in the register 44. Thus, at the end of the loading phase the register 44 stores a binary number representing the maximum number of pulses counted by the counter 45.

The duration of the loading phase of each operating cycle for the memory unit 30 is determined by the duration of the binary 1 signal on line 23 from the reading station. When this signal drops to the binary 0 level, the gate 37 is disabled to terminate the application of clock pulses CL1 to the gate 38 and, therefore, to the generator 36. It will be understood that as long as the signal on line 23 remains at the binary 1 level, the generator 36 is triggered repetitively in response to successive clock pulses CL1 to strobe successive data bits from line L1 into the memory unit 30.

When the "store data" signal on line 23 drops to the binary 0 level, it not only disables the gate 37 but also triggers a monostable (single shot) multivibrator 50 to switch the output thereof from the binary 1 level to the binary 1 level for a predetermined interval. The resulting signal, designated the "end load pulse" in FIG. 3, is applied to a pair of AND gates 51 and 52 connected to the S inputs of a pair of RS-latch-type flip-flops 53 and 54, respectively. The other inputs to the gates 51 and 52 are the output signals from the flip-flops 32 and 33 that determine which of the two memory units 30 and 31 is to be loaded each time a "store data" signal is received on line 23. More specifically, when the flip-flop 32 is in the set state, the binary 1 output signal therefrom enables the AND gate 51 to transmit the "end load pulse" to the set input of the flip-flop 53. This causes the flip-flop 53 to produce a binary 1 output signal which is applied to an AND gate 55 whose other input is the Q signal from a D-type flip-flop 56. The input to the flip-flop 56 is a "document edge detected" signal (FIG. 3) from the perforating station; this signal switches from the binary 0 level to the binary 1 level in response to the edge of each document approaching the perforating station, thereby indicating that the leading edge of a document has been detected approaching the perforating station and that one of the memory units 30 or 31 is to be unloaded to actuate the perforating equipment to encode the desired data on the document at the perforating station. When there is a coincidence of binary 1 signals at the two inputs to the gate 55, the gate produces a binary 1 output signal "unload memory No. 1" (FIG. 3) which initiates the unloading of the memory unit 30.

Before describing the unloading phase, it should be noted that the "end load" signal from the single shot multivibrator 51 also terminates the "load memory No. 1" signal by resetting the flip-flop 32. More specifically, the output of the multivibrator 50 is transmitted via a delay network 60 to an AND gate 61, which receives its other input from the flip-flop 53. Thus, a coincidence of binary 1 signals at the inputs to the gate 61 indicates that the loading of memory unit 30 is complete, and the resulting binary 1 output signal resets the flip-flop 32 to reduce the output thereof to a binary 0 signal. In addition, the output of the gate 61 is passed through an "OR"gate 62 and applied to the reset input of the counter 45 to restore the counter to an all-zero condition. However, the maximum count accumulated in the counter 45 during the loading phase is still retained in the holding register 44, which is not reset at this point in the cycle.

Turning next to the unloading phase that is initiated by the binary 1 output signal from the gate 55, this signal is applied to an AND gate 63 which receives a binary 1 signal at its other input as long as the oscillator 40 is not actuated. Consequently, arrival of the binary 1 signal from the gate 55 causes the gate 63 to produce a binary 1 output signal which is passed through the OR gate 39 to trigger the four-pulse generator 36 again. As mentioned previously, the first output pulse from the generator 36, produced on line 36a, is applied to the two-pulse oscillator 40 and the gate 41, both of which were ineffective during the loading phase. In the unloading phase, however, the gate 41 is enabled by the "unload memory No. 1" signal from the gate 55, so that each time the generator 36 is triggered the first output pulse therefrom is passed through the gate 41 and on through an OR gate 64 to produce a "punch strobe" signal (FIG. 3) that is applied to an output register 65. Each time the register 65 receives one of these pulses, data represented by the output signal from an OR gate 66 is entered into the register 65. The system for supplying this data to the gate 66 will be described below.

Returning to the oscillator 40 actuated by the first output pulse from the generator 36, the first output pulse from this oscillator, produced on line 40*a*, enables a comparator 67 which continuously receives and compares the output signal from the register 44 and the counter 45. As will be described below, the counter 45 controls the unloading of data from the memory unit 30, so when all the data has been unloaded from unit 30 the binary number represented by the output of the counter 45 will be the same as that stored in the register 44. When this equality of the two outputs occurs, it is sensed by the comparator 67 which responds by producing a binary 1 output signal which is used to terminate the unloading phase.

The second output pulse from the oscillator 40, produced on line 40*b*, is applied to the gate 63 to temporarily disable that gate, causing its output to drop to the binary 0 level. When the pulse on line 40*b* is terminated, the gate 63 is enabled again, returning its output to a binary 1 signal which re-triggers the generator 36. Thus, it can be seen that the generator 36 is repetitively triggered as long as the output of the gate 55 remains at the binary 1 level.

The second pulse from the generator 36 is inactive during the unloading phase because the flip-flop 32 is in the reset state producing a binary 0 output signal which disables the AND gate 34.

The third pulse is applied to the AND gate 24 along with the binary 1 signal from the gate 55, thereby producing a binary 1 output signal from the gate 24. This signal is passed through an OR gate 24 and applied to the stroke input of the punch mechanism in the perforating station.

The fourth pulse from the generator 36 performs the same function that it does during the loading phase, i.e., it increments the counter 45 by one each time the generator 36 is triggered. The output of the counter 45 has no effect on the register 44 during this unloading phase because the signal at the set input of the register 44 is a binary 0. However, each time the counter 45 is incremented, it unloads one bit of data from the memory unit 30, and the resulting output signal representing this data bit is applied to an AND gate 68. The other input to the gate 68 is the "unload memory No. 1" signal from gate 55, which enables the gate 68 to pass data signals from the memory unit 30 in response to detection of a document arriving at the perforating station. From the gate 68, the data signals are passed through the OR gate 66 to the output register 65 described previously. Thus, it can be seen that the data bits stored in the memory unit 30 are successively transmitted to the punch mechanism in synchronism with the output of the pulse generator 36 as long as the "unload memory No. 1" signal from the gate 55 remains at the binary 1 level.

Each time the memory unit 30 is unloaded, it triggers a conventional parity generator 30a which supplies an additional signal to the AND gate 68 to cause the parity bit to be added to the data recorded on the document at the perforating station whenever the data word comprises an odd number of bits. Thus, every data word recorded on the document comprises an even number of holes, and this fact can be used to check the accuracy of subsequent reading operations performed in response to the perforated data record.

It will be appreciated that there are actually multiple output lines from the memory unit 30, each of which is connected to the register 65 through its own AND gate 68 and parity generator 30a. To facilitate understanding of the illustrative system, only a single line and corresponding and gate 68 and parity generator 30a have been shown as connecting the memory unit 30 to the output register 65.

Upon completion of the unloading phase as sensed by the comparator 67, the binary 1 output signal produced by the comparator 67 is passed through an OR gate 69 to produce an "end punch" signal (FIG. 3) which is applied directly to a first pair of AND gates 70 and 71, and through a delay network 72 to a second pair of AND gates 73 and 74. The outputs of the first pair of gates 70 and 71 are connected to the set inputs of the two flip-flops 32 and 33, respectively, and one of these two gates is always enabled so that one of the two flip-flops 32 and 33 is always set in response to a binary 1 signal from the OR gate 69. For example, when the enabling signal from the gate 69 is produced in response to the unloading of the memory unit 30, the gate 70 is enabled by the binary 1 output signal "unload memory No. 1" from the gate 55. Consequently, the gate 70 produces a binary 1 signal which sets the flip-flop 32 to generate a new "load memory No. 1" signal to initiate another operating cycle for the memory unit 30. The binary 1 output signal from the flip-flop 32 is also applied to the and gate 73 which receives the output of the OR gate 69 via the delay network 72, thereby producing a binary 1 output signal from the gate 73 which is applied to the reset input of the flip-flop 53. This switches the output of the flip-flop 53 to a binary 0 signal which disables the gate 55 and thereby terminates the "unload memory No. 1" signal by switching the output of the gate 55 to a binary 0 signal. This, of course, terminates the unloading phase for memory unit 30.

As indicated by the legends in FIG. 3, the memory unit 31 is loaded with data while the memory unit 30 is being unloaded. The fact that the memory unit 31 is unloaded and ready to be loaded again is indicated by a binary 1 output signal from the AND gate 71, which is applied to the set input of the flip-flop 33. When flip-flop 33 is in the "set" state, it applies a binary 1 signal to an AND gate 80 which, when enabled by a binary 1 signal at its other input, applies a binary 1 signal to a second AND gate 81. This enables the gate 81 to pass the data signal, applied to its other input, to the memory unit 31.

Enabling of the gate 80 is controlled by one of the inputs of a second four-pulse generator 82, which operates in the same manner as the generator 36 to sequentially produce an output pulse on each of four different output lines 82*a*–82*d* each time it is triggered by an input pulse. More specifically, each time the input signal to the generator 82 changes from the binary 0 level to the binary 1 level, each of the four outputs of the generator 82 are switched from the binary 0 level to the binary 1 level for predetermined intervals that are staggered in time. These outputs are used to control both the loading and the unloading of the memory unit 31. The loading of memory unit 31 is initiated by the "store data" signal on line 23 from the reading station, in the same manner that this signal initiates the loading of memory unit 30. That is, whenever the "store data" signal goes to the binary 1 level, it enables the AND gate 37 to pass clock pulses CL1 to an AND gate 83 which also receives the output signal from the flip-flop 33. Thus, whenever the flip-flop 33 produces a binary 1 output signal, referred to as the "load memory No. 1" signal (FIG. 3), the gate 83 is enabled to pass the clock pulses CL1 through an OR gate 84 to the input of the four pulse generator 82. In response to each clock pulse received at its input, the generator 82 produces a sequence of four output pulses on the four output lines 82*a*–82*d*.

The first output pulse from the generator 82, produced on line 82*a*, is applied to a two-pulse generator 85 and an AND gate 86, both of which are ineffective during the loading phase but will be discussed in more detail below in connection with the unloading phase. The second output pulse, produced on line 82*b*, enables the AND gate 80 to produce the "load memory No. 2" output signal from the flip-flop 33 onto the gate 81 to enable the application of the data signals from line 22 to the memory unit 31.

The third output pulse from the generator 82, produced on line 82*c*, enables an AND gate 87 whose other input is the "load memory No. 2" signal from flip-flop 32. (The pulse on line 82*c* is also applied to a gate 26 which is disabled by its other input during the loading phase). During the loading phase of each cycle of operation, i.e., when the gate 87 is enabled by a binary 1 signal from the flip-flop 33, the gate 87 applies a binary 1 signal to the set input of a holding register 88 which continuously monitors the output of a binary counter 89 which receives the fourth output pulse produced by the generator 82 on line 82*d*. The counter 89 responds to pulses produced on the line 82*d* to produce an output signal representing the number of pulses counted, and this output signal is applied to the address input of the memory unit 31 to store successive bits of data applied to the unit 31 in different positions therein. Meanwhile, each time the counter 89 is incremented during the loading phase, the holding register 88 receives a set input from the gate 87 so that the count accumulated in the counter 89 is stored in the register 88. Thus, at the end of the loading phase the register 88 stores a binary number representing the maximum number of pulses counted by the counter 89.

The duration of the loading phase of each operating cycle for the memory unit 31 is determined by the duration of the binary 1 signal on line 23 from the reading station. When this signal drops to the binary 0 level, the gate 37 is disabled to terminate the application of clock pulses CL1 to the gate 83 and, therefore, to the generator 82. It will be understood that as long as the signal on line 23 remains at the binary 1 level, the generator 82 is triggered repetitively in response to successive clock pulses CL1 to strobe successive data bits from line L1 into the memory unit 31.

When the "store data" on line 23 drops to the binary 0 level, it not only disables the gate 37 but also triggers the single shot multivibrator 50 described previously. This switches the output of the multivibrator 50 from the binary 0 level to the binary 1 level for a predetermined interval to produce the "end load pulse" (FIG. 3) which is applied to the AND gate 51 and 52. The other inputs to the gates 51 and 52 are the output signals from the flip-flops 32 and 33 that determine which of the two memory units 30 and 31 is to be loaded each time a "store data" signal is received on line 23. More specifically, when the flip-flop 33 is in the set state, the binary 1 output signal therefrom enables the AND gate 52 to transmit the "end load pulse" to the set input of the flip-flop 54. This causes the flip-flop 54 to produce a binary 1 output signal which is applied to an AND gate 90 whose other input is the Q output signal from the D-type flip-flop 56. The input to the flip flop 56 is the "document edge detected" signal (FIG. 3) from the perforating station which switches to the binary 1 level in response to the edge of each document approaching the perforating station. This indicates that the leading edge of the document has been detected approaching the perforating station and that one of the memory units 30 or 31 is to be unloaded to actuate the perforating equipment to encode the desired data on the document at the perforating station. As described previously, when the flip-flop 56 produces a binary 1 signal at its Q output, an AND gate 55 is enabled to produce an "unload memory No. 1" signal. When the flip-flop 56 is in its other stable state, however, it produces a binary 1 signal at its Q bar output, so that there is a coincidence of binary 1 signals at the two inputs to the gate 90, thereby producing a binary 1 output signal, designated the "unload memory No. 2" signal (FIG. 3), which initiates the unloading of memory unit 31.

Before describing the unloading phase, it should be noted that the "end load" signal from the single shot multivibrator 50 also terminates the "load memory No. 2" signal by resetting the flip flop 33. More specifically, the output of the multivibrator 50 is transmitted via the delay network 60 to an AND gate 91 which receives its other input from the flip-flop 54. Thus, a coincidence of binary 1 signals at the inputs to the gate 91 indicates that the loading of memory unit 31 is complete, and the resulting 1 output signal resets the flip-flop 33 to reduce the output thereof to a binary 0 signal. In addition, the output of the gate 91 is passed through an OR gate 92 and applied to the reset input of the counter 89 to restore the counter to an all-zero condition. However, the maximum count accumulated in the counter 89 during the loading phase is still retained in the holding register 88, which is not reset at this point in the cycle.

Turning next to the unloading phase that is initiated by the binary 1 output signal from the gate 90, this signal is applied to an AND gate 93 which receives a binary 1 signal at its other input as long as the oscillator 85 is not actuated. Consequently, arrival of the binary 1 signal from the gate 90 causes the gate 93 to produce a binary 1 output signal which is passed through the OR gate 84 to trigger the four-pulse generator 82 again. As mentioned previously, the first output pulse from the generator 82, produced on line 82a, is applied to the two-pulse oscillator 85 and the gate 86, both of which were ineffected during the loading phase. In the unloading phase, however, the gate 86 is enabled by the "unload memory No. 2" signal from the gate 90, so that each time the generator 82 is triggered the first output pulse therefrom is passed through the gate 86 and on through the OR gate 64 to the output register 65. Each time the register 65 receives one of these pulses, data represented by the output signal from the OR gate 66 is entered into the register 65.

Returning to the oscillator 85 actuated by the first output pulse from the generator 82, the first output pulse from this oscillator, produced on line 85*a*, enables a comparator 94 which continuously receives and compares the output signal from the register 88 and the counter 89. As will be described below, the counter 89 controls the unloading of memory unit 31, so when all the data has been unloaded from unit 31, the binary number represented by the output of the counter 89 will be the same as that stored in the register 88. When this equality of the two outputs occurs, it is sensed by the comparator 94 which responds by producing a binary 1 output signal which is used to terminate the unloading phase.

The second output pulse from the oscillator 85, produced on line 85*b*, is applied to the gate 93 to temporarily disable that gate, causing its output to drop the binary 0 level. When the pulse on line 85*b* is terminated, the gate 93 is enabled again, returning its output to a binary 1 signal which retriggers the generator 82. Thus, it can be seen that the generator 82 is repetitively triggered as long as the output of the gate 90 remains at the binary 1 level.

The second pulse from the generator 82 is inactive during the unloading phase because the flip-flop 33 is in the reset state producing a binary 0 output signal which disables the AND gate 80. The third pulse is applied to the AND gate 26 along with the binary 1 signal from the gate 90, thereby producing a binary 1 output signal from the gate 26. This signal is passed through an OR gate 25 and applied to the strobe input of the punch mechanism in the perforating station.

The fourth pulse from the generator 82 performs the same function that it does during the loading phase, i.e., it increments the counter 89 by one each time the generator 82 is triggered. The output of the counter 89 has no effect on the register 88 during this unloading phase because the signal at the set input of the register 88 is a binary 0. However, each time the counter 89 is incremented, it unloads one bit of data from the memory unit 31, and the resulting output signal representing this data bit is applied to an AND gate 95. The other input to this gate 95 is the "unload memory No. 2" signal from gate 90, which enables the gate 95 to pass data signals from the memory 31 in response to detection of a document arriving at the perforating station. From the gate 68, the data signals are passed through the OR gate 66 to the output register 65 described previously. Thus, it can be seen that the data bits stored in the memory unit 31 are successively transmitted to the punch mechanism in synchronism with the output of the pulse generator 82 as long as the "unload memory No. 2" signal from the gate 90 remains at the binary 1 level.

Each time the memory unit 31 is unloaded, it triggers a conventional parity generator 31a which supplies an additional signal to the AND gate 68 to cause a parity bit to be added to the data recorded on the document at the perforating station whenever the data word comprises an odd number of bits. Thus, every data word recorded on the document comprises an even number of holes, and this fact can be used to check the accuracy of subsequent reading operations performed in response to the perforated data record.

Upon completion of the unloading phase as sensed by the comparator 94, the binary 1 output signal produced by the comparator 94 is passed through the OR gate 69 to produce the "end punch" signal (FIG. 3) which is applied directly to the AND gates 70 and 71, and through the delay network 72 to the AND gates 73 and 74 as described previously. When the enabling signal from the gate 69 is produced in response to the unloading of the memory unit 31, the gate 71 is enabled by the binary 1 output signal "unload memory No. 2" from the gate 90. Consequently, the gate 71 produces a binary 1 signal which sets the flip-flop 33 to generate a new "load memory No. 2" signal to initiate another operating cycle for the memory unit 31. The binary 1 output signal from the flip-flop 33 is also applied to the AND gate 74 which receives the output of the OR gate 69 via the delay network 72, thereby producing a binary 1 output signal from the gate 74 which is applied to the reset input of the flip-flop 54. This switches the output of the flip-flop 54 to a binary 0 signal which disables the gate 90 and thereby terminates the unload memory No. 2" signal by switching the output of the gate 90 to a binary 0 signal. This, of course, terminates the unloading phase for memory unit 31.

In accordance with one specific aspect of the invention, the control system includes means responsive to the filling of both memory units for generating an output signal indicating that there is no memory capacity available for storing data signals from the reading station. Thus, in the illustrative system the outputs of both the flip-flops 53 and 54 are connected to an AND gate 100. When both memory units 30 and 31 are filled, the output signals from both the flip-flops 53 and 54 are binary 1 signals, thereby producing a binary 1 output signal from the gate 100 to indicate that no additional memory capacity is available. This output signal may be used to temporarily interrupt the flow of documents along the processing line until one of the memory units is unloaded, at which time the output of the gate 100 returns to the binary 0 level.

In further keeping with the invention, the data signals transmitted to the punch mechanism from the register 65 are compared with "verification" signals (FIG. 3) generated at the perforating station and representing the punch elements that actually pass through the document to detect any error between the commanded punch operation and the actual punch operation. Thus, the verification signals generated on line 101 are applied to a comparator 102 whose other input is the output of the register 65. Whenever there is a discrepancy between the two inputs to the comparator 102, indicating that the punch has not accurately responded to the command signals from the register 65, the comparator 102 produces an "error" output signal which actuates a shut-down device 103 for stopping the flow of documents to permit correction of the error.

I claim as my invention:

1. In a document processing system having a reading station and a perforating station positioned along a single document processing line, said reading station including means for producing electrical data signals representing the data on documents passed therethrough, and said perforating station including means responsive to electrical data signals for recording data on documents passed therethrough by perforating said documents, the improvement comprising the combination of:

a. memory means operatively connected to said reading station for receiving and storing the electrical data signals produced by said reading station, said memory means including a plurality of memory units each of which is capable of storing all the data from any given document, said memory means further including gating means interposed between the reading station and the memory units for loading successive groups of electrical signals representing data read from successive documents sequentially in successive ones of the memory units,
b. document sensing means for generating an electrical control signal in response to the arrival of a document at said perforating station.
c. and retrieval means coupled to said memory means and responsive to said control signal for retrieving the data signals representing data read from the arriving document and coupling said data signals to the perforating station for actuating said perforating station to re-record the read data on said document by perforating the document, said retrieval means including means for retrieving the data signals stored in one of said memory units while another group of data signals is being loaded into one of the other memory units.

2. A reading and perforating system as set forth in claim 1 wherein the memory means includes counting means for counting the number of bits of data stored within a memory unit, and the retrieval means includes means responsive to the counting means for deactuating the perforating station when the said number of bits has been perforated.

3. A document processing system as set forth in claim 1 which includes means responsive to the retrieval of all the data signals stored in one of said memory units for enabling said gating means to load another group of said data signals in the cleared memory unit.

4. A document processing system as set forth in claim 1 which includes means for retrieving said successive groups of data signals from said plurality of memory units in the same order in which said data signals are loaded into said units.

5. A reading and perforating system as set forth in claim 1 which includes means responsive to actuation of said perforating station for generating electrical verification signals representing the perforating elements that actually pass through the document at the perforating station, and means for comparing said verification signals with the data retrieved from said memory means for actuating said perforating station to detect any errors in the data recorded on the document at the perforating station.

6. A reading and perforating system as set forth in claim 5 which includes means responsive to any error detected by said comparing means for terminating the passage of documents along said processing line to permit removal of the document on which the error appears.

7. A reading and perforating system as set forth in claim 1 which includes means responsive to the filling of all of said memory units for generating an output signal indicating that there is no memory capacity available for storing the signals representing read data.

8. A method of transferring electrical data signals from a reading station to a perforating station in a document processing system having the reading station and the perforating station positioned along a single document processing line, said reading station including means for producing electrical data signals representing the data on documents passed therethrough, and said perforating station including means responsive to electrical data signals for recording data on documents passed therethrough by perforating said documents, said method comprising the steps of:

a. loading the electrical data signals produced by said reading station in groups corresponding to the data read from successive documents sequentially in successive ones of a plurality of memory units for storage,
b. temporarily interrupting the loading when all of the memory units are filled,
c. generating an electrical control signal in response to the arrival of a document at said perforating station,
d. retrieving the data signals representing data read from the arriving document from the memory unit storing such data in response to said control signal and coupling said data signals to the perforating station for actuating said perforating station to re-record the read data on said document by perforating the document,
e. clearing the memory unit while retrieving data therefrom, and
f. resuming the interrupted loading for storing another group of said data signals in the cleared memory unit.

9. A method as set forth in claim 8 wherein the loading of the data signals into one of said memory units is accomplished while retrieving another group of data signals from one of the other memory units.

10. A method as set forth in claim 9 which includes the steps of generating an electrical signal in response to the retrieval of all the data signals stored in one of said memory units, and resuming the interrupted storing for storing another group of said data signals in the cleared memory unit in response to said signal while data is being retrieved from another memory unit.

11. A method as set forth in claim 9 which includes the step of retrieving said successive groups of data signals from said plurality of memory units in the same order in which said data signals are loaded into said units.

12. A method as set forth in claim 8 which includes the steps of generating electrical verification signals representing the perforating elements that actually pass through the document at the perforating station, and comparing said echo signals with the data retrieved from said memory means for actuating said perforating station to detect any errors in the data recorded on the document at the perforating station.

13. A method as set forth in claim 12 which includes the step of terminating the passage of documents along said processing line to permit removal of the document on which the error appears.

* * * * *